US006999634B2

(12) United States Patent  (10) Patent No.:  US 6,999,634 B2
Hong  (45) Date of Patent:  Feb. 14, 2006

(54) SPATIO-TEMPORAL JOINT FILTER FOR NOISE REDUCTION

(75) Inventor: Sung Hoon Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 683 days.

(21) Appl. No.: 09/906,705

(22) Filed: Jul. 18, 2001

(65) Prior Publication Data

US 2002/0028025 A1  Mar. 7, 2002

(30) Foreign Application Priority Data

Jul. 18, 2000  (KR)  ................................ 2000-41112

(51) Int. Cl.
  *G06K 9/40*  (2006.01)

(52) U.S. Cl. ...................... 382/275; 382/261; 382/264; 382/265; 382/266; 358/463; 348/241; 348/470; 348/606; 348/607; 348/619; 348/909; 348/910

(58) Field of Classification Search ................ 382/260, 382/261, 264, 265, 266, 275; 348/241, 470, 348/606, 607, 619, 909, 910; 358/463
  See application file for complete search history.

(56) References Cited

U.S. PATENT DOCUMENTS 5,600,731 A * 2/1997 Sezan et al. ................. 382/107
5,771,318 A * 6/1998 Fang et al. ................... 382/261
6,067,125 A * 5/2000 May ............................ 348/607

OTHER PUBLICATIONS

D.T.Kuan et al., "Adaptive Noise Smoothing Filter For Images With Signal-Dependent Noise", IEEE Transactions on Pattern Analysis and Machine Intelligence, Mar. 1985, vol. PAM1-7, No. 2, pp. 165-177.*
M.K. Ozkan et al. "Adaptive Motion-Compensated Filtering of Noisy Image Sequences", IEEE Transactions on Circuits and Systems for Video Technology, vol. 3, No. 4, Aug. 1993 pp. 277-290.*
Jong-Sen Lee, "Digital Enhancement and Noise Filtering by Use of Local Statistics", IEEE Transactions on Pattern Analysis and Machine Intelligence, vol. PAMI-2, No. 2, Mar. 1980.*
Sezan et al. "Temporally Adaptive Filtering of Noisy Image Sequences Using a Robust Motion Estimation Algorithm" 1991, Electronic Imaging Research Laboratories, Esatman Kodak Company, pp. 2429-2432.*

* cited by examiner

*Primary Examiner*—Andrew W. Johns
*Assistant Examiner*—Patrick L. Edwards
(74) *Attorney, Agent, or Firm*—Birch, Stewart,Kolasch & Birch LLP

(57) ABSTRACT

A spatio-temporal joint filter and a spatial joint filter for noise reduction are disclosed. The spatio-temporal joint filter includes a spatial joint filter including the first and second sub filters having different characteristics and includes a temporal joint filter. When the present invention is adequately used, an edge/detail region of an image is well preserved, an aggressive noise reduction is performed on a flat region, and the temporal flicker problems are eliminated. Additionally, it has an intrinsic motion compensation effect by using the spatio-temporal correlation between the adjacent frames.

11 Claims, 4 Drawing Sheets

$|f-f_1| \geq |f-f_2|$
$\sigma(n) \geq \sigma(n2) \geq \sigma(n1)$ $\sigma(n)$ : noise standard deviation

SPATIO-TEMPORAL JOINT FILTER FOR NOISE REDUCTION

BACKGROUND OF THE INVENTION

1. Field of the Invention

The present invention relates to noise reduction filters eliminating a noise signal included in an image signal, and more particularly, to a spatio-temporal and spatial joint noise reduction filters that combines more than one filters having various filter characteristics.

2. Background of the Related Art

In general, video signals initially received from a video camera and transmitted through a channel unavoidably contain noise signals. A noise signal added to a video signal provides a degraded image to viewers and has negative effects on the image signal processes. Therefore, signal receivers or any other necessary devices have a noise reduction process to avoid such problems. Some of the objectives need to be taken into consideration are as follows.

(1) Noise Elimination:

A noise signal should be eliminated so that a clear image can be provided. Particularly, an aggressive noise reduction control is necessary especially for a flat region of an image.

(2) Preservation of Edge/Detail Region:

Unfortunately, some of the edge or detail region of an image may be removed when an every region of the image goes through the aggressive noise reduction process. Therefore, a reasonable degree of noise reduction needs be carefully determined in order to preserve the edge or detail region of the image.

(3) Temporal Flickers:

A noise signal sometimes causes temporal flickers to occur between adjacent frames. This also degrades the image quality.

The first and second objectives have a relationship that one can be achieved at the expense of the other. In other words, an aggressive noise reduction performed to achieve the first objective will result in losing some of the edge/detail region of an image. On the other hand, an insufficient degree of noise reduction for achieving the second object will not satisfactorily remove the noise signal for the first objective.

In the signal processing literature, several filters have been reported for image noise suppression and image detail preservation. They are A-LMMSE (Adaptive Linear Minimum Mean Squared Error), AWA (Adaptive Weighted Average), and A-MEAN filters. The related articles are listed below:

D. T. Kuan, A. A. Sawchuk, T. C. Strand, and P. Chavel, "Adaptive Noise Smoothing Filter For Images With Signal-Dependent Noise", *IEEE Transactions on Pattern Analysis and Machine Intelligence*, March 1985, vol. PAM1–7, No. 2, pp. 165–177.

M. K. Ozkan, M. I. Sezan, and A. M. Tekalp, "Adaptive Motion-Compensated Filtering of Noisy Image Sequences", *IEEE Transactions on Circuits and Systems for Video Technology*, vol. 3, No. 4, August 1993 at 277–290.

Carlos Polamaza-Raez and Clare D. McGillem, "Digital Phase-Locked Loop Behavior with Clock and Sampler Quantization", *IEEE Trans. on Commun.*, Vol. COM-33, No. 8, August 1985, pages 753 to 759.

According to the above mentioned references, a noise-contaminated input pixel signal g(i,j,t), whose horizontal, vertical, and time locations are (i,j,t), can be expressed as $$g(i,j,t) = f(i,j,t) + n(i,j,t) \quad \text{Equation (1)}$$

where f(i,j,t) and n(i,j,t) represent an original signal and a noise signal, respectively. Therefore, a performance of a noise reduction filter depends on how accurately f(i,j,t) can be extracted from g(i,j,t). Particularly, a noise signal included in the flat region of an image is easily visible by viewers, but the noise included in the detail/edge region is not. This is called a masking effect. A-LMMSE, AWA, and A-MEAN filters may vary the level of noise reduction based on the characteristics of the noise-contaminated signal.

The A-LMMSE filter, which is originated from a linear predictor, obtains its estimated original signal f(i,j,t) by using $$\hat{f}(i,j,t) = \varpi(i,j,t)g(i,j,t) + (1 - \varpi(i,j,t))\mu_g(i,j,t) \quad \text{Equation (2)}$$

$$\varpi(i,j,t) = \frac{\sigma_f^2(i,j,t)}{\sigma_f^2(i,j,t) + \sigma_n^2}$$

where $\sigma_f^2(i,j,t)$ is a original signal variance which is the local variance of the pixel signals included in a support region of the noise reduction filter, $\sigma_n^2$ is the noise variance, $\mu_g(i,j,t)$ is the mean signal of pixel signals included in the support region. For a flat region of an image, $\sigma_f^2(i,j,t)$ is much smaller than $\sigma_n^2$. Consequently, $\overline{\omega}(i,j,t)$ becomes close to zero, and the estimated original signal of the A-LMMSE filter f(i,j,t) becomes close to $\mu_g(i,j,t)$. On the other hand, for an edge/detail region of the image having drastic changes $\sigma_f^2(i,j,t)$ is usually much larger than $\sigma_n^2$. Therefore, $\overline{\omega}(i,j,t)$ becomes close to one, and consequently, f(i,j,t) becomes close to the noise-contaminated input signal g(i,j,t).

In addition, the AWA and A-MEAN filters perform noise reduction using a weighted average, and each weighting factor $\overline{\omega}(l,m,t)$ is determined based on a difference between an input pixel signal g(i,j,t) and a pixel signal included in the support region g(l,m,t) as shown in Equation 3,4 and 5, where the (l,m,t) corresponds to a support region of the filter.

$$\hat{f}(i,j,t) = \frac{1}{W} \sum_{l,m,t \in S} \varpi(l,m,t) g(l,m,t) \quad \text{Equation (3)}$$

$$W = \sum_{l,m,t \in S} \varpi(l,m,t)$$

Each weighting factor $\overline{\omega}(l,m,t)$ of the AWA filter is given by $$\varpi(l,m,t) = \frac{1}{1 + \alpha\{\max[\varepsilon, (g(l,m,t) - g(i,j,t))^2]\}} \quad \text{Equation (4)}$$

where $\alpha$ and $\epsilon$ are usually set to $\alpha=1$ and $\epsilon=2\sigma_n^2$. As the input pixel signal g(i,j,t) and a pixel signal included in the support region g(l,m,t) are close to each other, the corresponding weight $\overline{\omega}(l,m,t)$ increases. In contrast, as the difference between g(i,j,t) and g(l,m,t) is larger, $\overline{\omega}(l,m,t)$ decreases. On the other hand, $\overline{\omega}(l,m,t)$ of the A-MEAN filter is given by $$\varpi(l,m,t) = \begin{cases} 1 & \text{for } |x| \le c \\ 0 & \text{for } |x| > c \end{cases} \quad \text{Equation (5)}$$

$$x = g(l,m,t) - g(i,j,t)$$

where c represents a predetermined limiting factor.

According to Equation (5), each weighting factor of the A-MEAN filter is set to one if the difference between g(i,j,t) and g(l,m,t) is less than or equal to c and becomes zero if the difference is larger than c. In general, c is set to $c=3\sigma_n^2$. As shown in Equations (4) and (5), when the difference signal g(l,m,t)−g(i,j,t) is small, an aggressive noise reduction is performed by increasing $\overline{\omega}$(l,m,t). On the other hand, when the difference is large, it performs a gradual noise reduction by using a lower $\overline{\omega}$(l,m,t).

In conclusion, the AWA and A-MEAN filters having the characteristics different from the A-LMMSE vary the level of noise reduction based on the characteristics of an image. For example, an aggressive noise reduction is performed on the flat region of an image to eliminate the noise signal, and a moderate noise reduction is used for edge/detail preservation. However, they include the structural limitations due to their two dimensional characteristics and do not eliminate the temporal flicker mentioned earlier. If the support regions of those filters are expanded to three dimensions, the noise reduction performance may be deteriorated, resulting the blurred images. In order to avoid such problems, methods for noise reduction using motion information between image frames such as a motion adaptive noise reducer are introduced. The motion adaptive noise reducer has a reasonably good noise reduction performance while preserving a detail region of an image. However, it introduces other problems. First, the noise reduction performance of the motion adaptive noise reducer depends the accuracy of motion information. However, the noise included in the image makes it difficult to obtain the accurate information. Second, the result of the noise reduction performed on a region having motions is not satisfactory. Especially, the noise included in a region having slow motions needs to be eliminated.

SUMMARY OF THE INVENTION

Accordingly, the present invention is directed to a joint spatio-temporal noise-reduction filter that substantially obviates one or more problems due to limitations and disadvantages of the related art.

An object of the present invention is to provide a joint spatio-temporal noise-reduction filter that preserves edge/detail regions of an image, performs a aggressive noise reduction on flat regions, and eliminates temporal flickers occurred between adjacent image frames by combining more than one noise reduction filters having various characteristics.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a spatial joint filter for noise reduction includes a first filter determining a first weighted average of support region pixel signals corresponding to an input signal using first weighting factors, each of the first weighting factors depending on the input signal and each of the support region pixel signals; and a second filter determining a second weighted sum of the input signal and the first weighted average using a second weighting factor that depends on an original signal variance and a noise variance.

In another aspect of the present invention, a spatial-temporal joint filter for noise reduction includes a spatial joint filter, a temporal joint filter and a frame memory. The spatial joint filter includes a first filter determining a first weighted average of current support region signals of an input signal using first weighting factors, the current support region signals being included in a current frame; and a second filter determining a second weighted sum of the input signal and the first weighted average using a second weighting factor that depends on a original signal variance and a noise variance. The temporal joint filter includes a third filter determining a third weighted average of the second weighted sum and previous support region signals of said input signal using a third weighting factors, the previous support region signals being included in a previous frame; and a fourth filter determining a fourth weighted sum of the second weighted sum and the third weighted average using a fourth weighting factor that depends on a spatio-temporal signal variance and the noise variance. The frame memory stores the fourth weighted sum of the current frame and feedbacks the fourth weighted sum to the third filter for noise estimation of a next frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
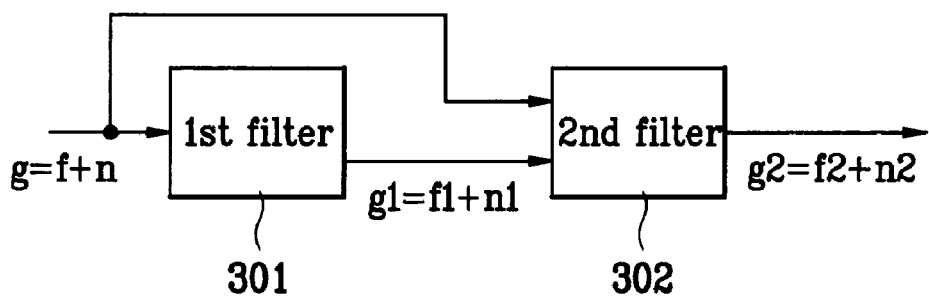
FIG. 1 illustrates a brief structure of a spatial joint noise-reduction filter according to the present invention.

The present invention relates to a joint spatio-temporal noise-reduction filter that combines an AWA (or A-MEAN) filter characteristic together with an A-LMMSE filter characteristic. FIG. 1 illustrates a brief structure of a spatial joint noise-reduction filter according to the present invention. It includes a first filter (301) filtering a input signal g (f+n) and generating g1 (f1+n1); and a second filter (302) filtering g (f+n) and g1 (f1+n1) and generating g2 (f2+n2). According to the present invention, f2 is closer to the original input signal f than f1: $|f-f_1| \geq |f-f_2|$. In addition, the level of noise reduction of the first filter (301) is less than that of the second filter (302). The variances of the noises are such that $\sigma(n) \geq \sigma(n2) \leq \sigma(n1)$.

Figure 2:
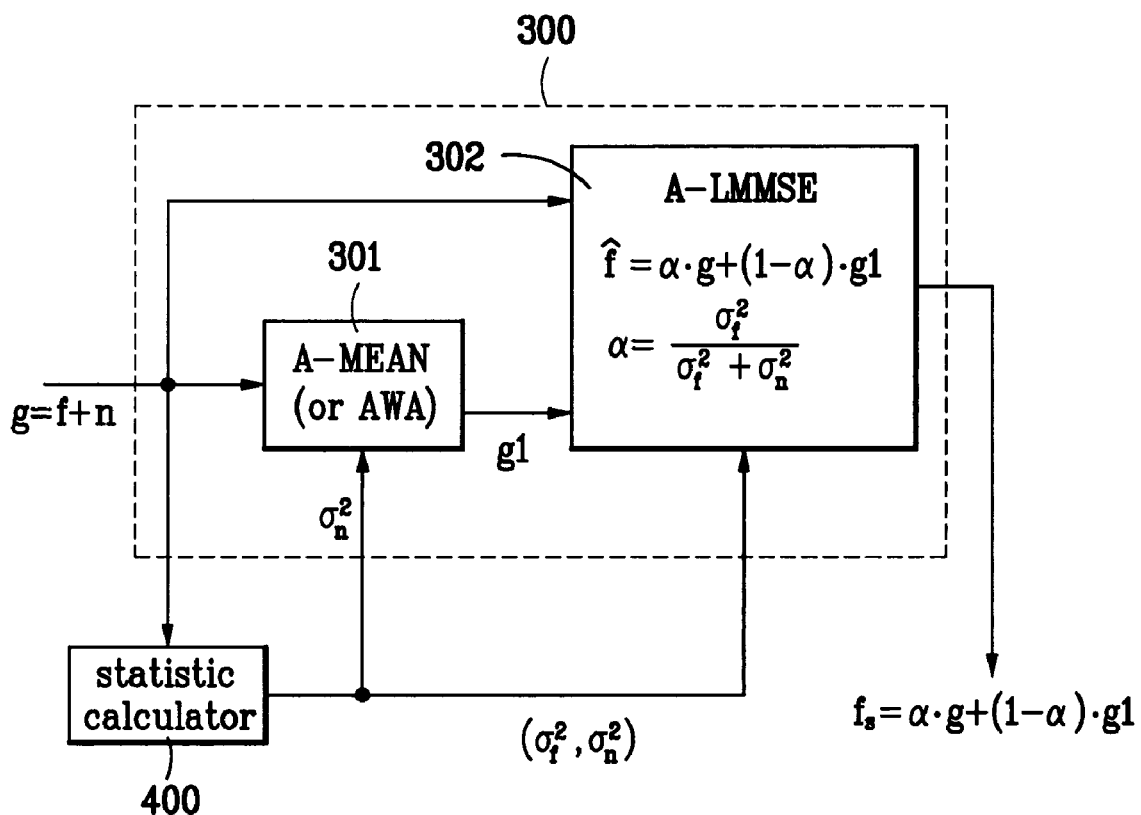
FIG. 2 illustrates a two-dimensional joint spatial noise reduction filter according to the present invention.

The complexity and performance of the joint filter according to the present invention depend on the characteristic and arrangement of each filter being used. FIG. 2 illustrates a two-dimensional joint spatial noise reduction filter according to the present invention where an A_MEAN or AWA filter is used as a first filter, and an A-LMMSE filter is used as a second filter. According to FIG. 2, the A-LMMSE filter being used as the second filter uses the output (g1) from the first filter for an improved edge/detail preserving property. The A-LMMSE filter (302) receives g1 from the first filter 301 instead of the average signal of pixels in the support region. The estimated original signal output $f_s(i,j,t)$ of the spatial joint noise reduction filter (300) is described by $$f_s(i, j, t) = \alpha(i, j, t)g(i, j, t) + [1 - \alpha(i, j, t)]gl(i, j, t) \quad \text{Equation (6)}$$

$$\alpha(i, j, t) = \frac{\sigma_f^2(i, j, t)}{\sigma_f^2(i, j, t) + \sigma_n^2}$$

where the original signal variance $\sigma_f^2(i,j,t)$ is calculated from a statistic calculator (400) by $$\sigma_f^2(i,j,t) = max[\sigma_g^2(i,j,t) - \sigma_n^2, 0] \quad \text{Equation (7)}$$

where $\sigma_g^2(i,j,t)$ represents a local variance of an input pixel signal $g(i,j,t)$ and is obtained by $$\sigma_g^2(i, j, t) = E[(g(i, j, t) - \mu_g(i, j, t))^2] \quad \text{Equation (8)}$$

$$= E[g^2(i, j, t)] - \mu_g^2(i, j, t)$$

$$\cong \frac{1}{S} \sum_{(i,j) \in S} g^2(i, j, t) - \left[\frac{1}{S} \sum_{(i,j) \in S} g(i, j, t)\right]^2$$

The spatial joint noise reduction filter shown in FIGS. 1 and 2 may not have the desired noise reduction property while reasonably preserving the edge/detail region. This problem can be eliminated by using a spatio-temporal joint noise reduction filter that combines a spatial joint filter with a temporal joint filter. In other words, the spatio-temporal noise reduction filter simultaneously can have an effective noise reduction property and preservation of edge/detail regions while eliminating the temporal flickers.

Figure 3:
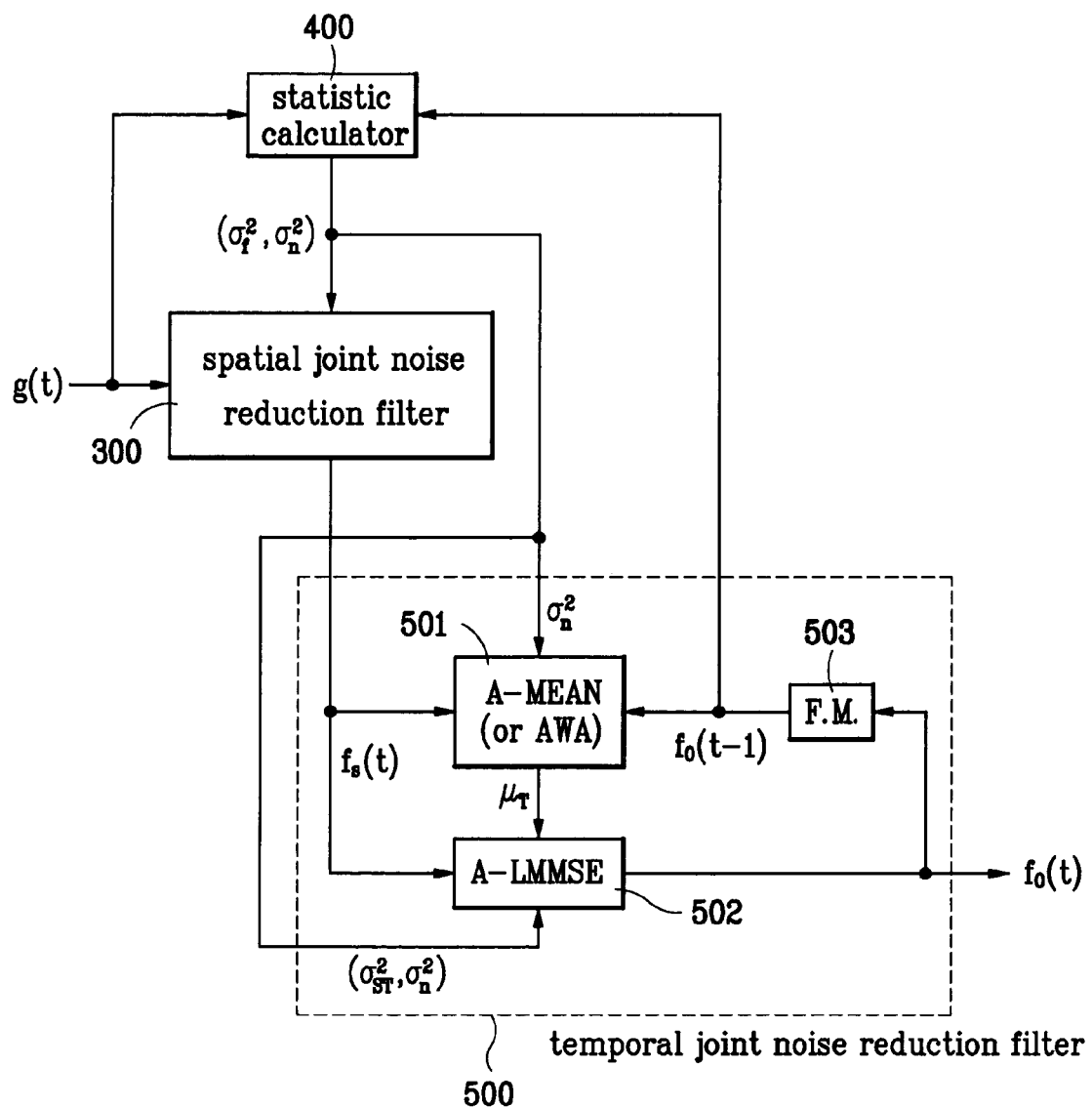
FIG. 3 illustrates a spatio-temporal noise reduction filter according to the present invention.

FIG. 3 illustrates the spatio-temporal noise reduction filter according to the present invention. It includes a spatial joint noise reduction filter (300), a temporal joint noise reduction filter (500), and a statistic calculator (400). In the temporal joint noise reduction filter, an A-MEAN or AWA filter is used as a first filter (501), and an A-LMMSE filter is used as a second filter (502). It further includes a frame memory (503) that outputs a final output signal of the previous frame $f_o(i,j,t-1)$ after storing a final output signal of the current frame $f_o(i,j,t)$. The first filter (501) in the temporal joint noise reduction filter (500) receives the output $f_s(i,j,t)$ from the spatial joint noise reduction filter (300) and the signal of the pixel of the previous frame in the support region $f_o(i,j,t-1)$ and performs its noise reduction. Then the second filter (502) receives the output $\mu_T(i,j,t)$ from the first filter (501) and $f_s(i,j,t)$, and it performs a noise reduction to generate $f_o(i,j,t)$.

Figure 4:
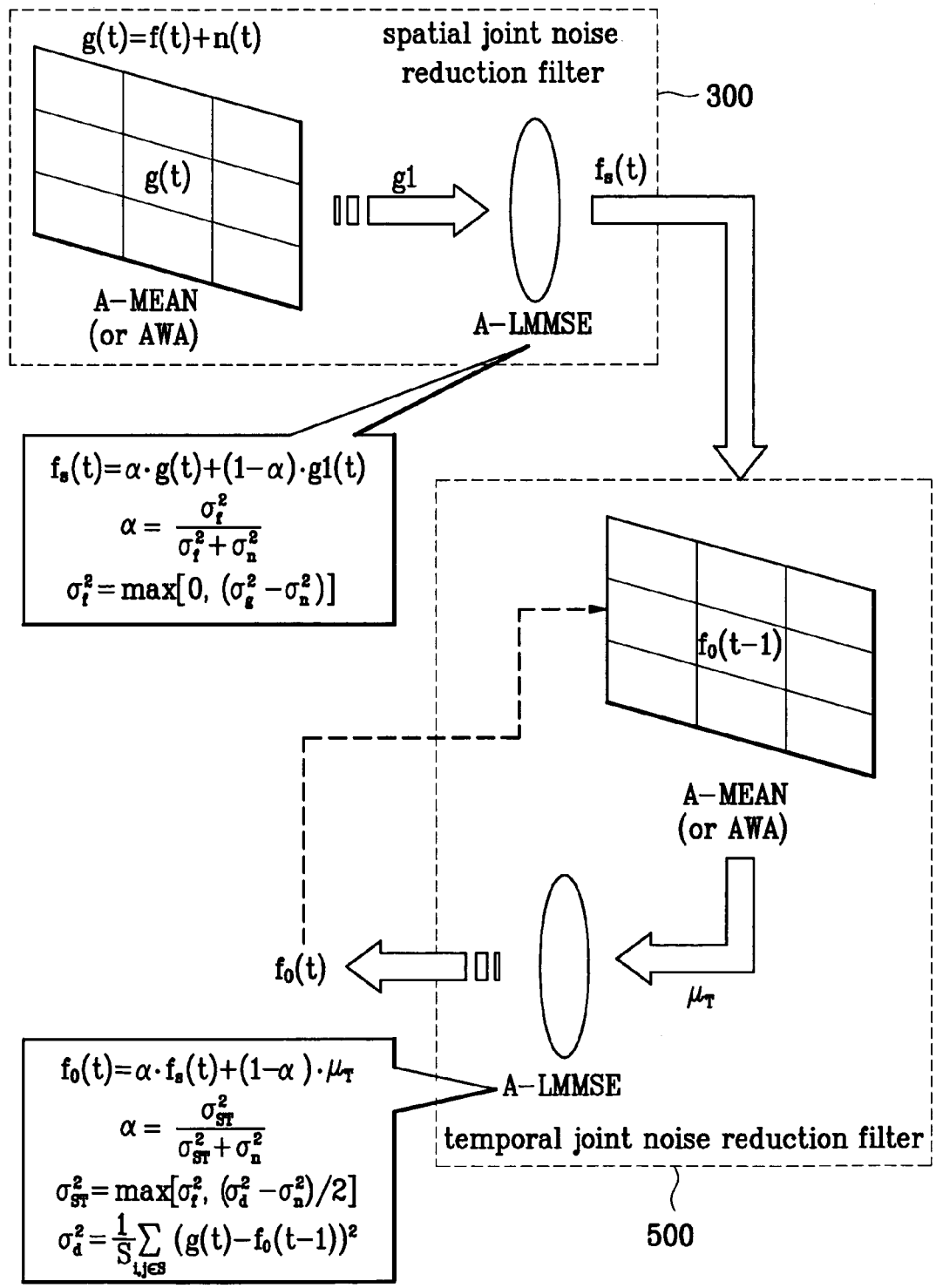
FIG. 4 illustrates an infinite impulse response (IIR) type spatio-temporal joint noise reduction filtering steps according to the present invention.

FIG. 4 illustrates an infinite impulse response (IIR) type spatio-temporal joint noise reduction filtering steps according to the present invention. The spatial joint noise reduction filter (300) outputs its noise-eliminated signal $f_s(i,j,t)$ by using Equation (6). Thereafter, the first filter (501) of the temporal noise reduction filter (500) receives $f_s(i,j,t)$ and generates its output $\mu_T(i,j,t)$ by using $$\mu_T(i, j, t) = \quad \text{Equation (9)}$$

$$\frac{1}{W} \left\{ \varpi_o f_s(i, j, t) + \sum_{l,m,t \in S} \varpi(l, m, t-1) f_o(l, m, t-1) \right\}$$

$$W = \varpi_o + \sum_{l,m,t \in S} \varpi(l, m, t-1)$$

where $f_o(l,m,t-1)$ represents previous pixel signals included in the support region, and for AWA filter: $\quad$ Equation (10)

$$\varpi_o = \frac{1}{1 + \alpha \varepsilon}$$

$$\varpi(l, m, t-1) = $$

$$\frac{1}{1 + \alpha \{max[\varepsilon, (f_o(l, m, t-1) - f_s(l, m, t-1))^2]\}} \text{ and}$$

For A-MEAN $\quad$ Equation (11)

$$\varpi_o = 1, \varpi(l, m, t-1) = \begin{cases} 1 & \text{for } |x| \leq c \\ 0 & \text{for } |x| > c. \end{cases}$$

$$x = f_o(l, m, t-1) - f_s(i, j, t)$$

The second filter 502 of the temporal noise reduction filter 500 receives $\mu_T(i,j,t)$ and $f_s(i,j,t)$ from the first filter 501 and the spatial noise reduction filter 300 and generates a final noise-eliminated pixel signal $f_o(i,j,t)$ by $$f_o(i, j, t) = \alpha(i, j, t) f_s(i, j, t) + \{1 - \alpha(i, j, t)\} \mu_T(i, j, t) \quad \text{Equation (12)}$$

$$\alpha(i, j, t) = \frac{\sigma_{ST}^2(i, j, t)}{\sigma_{ST}^2(i, j, t) + \sigma_n^2}$$

where $\sigma_{ST}^2(i,j,t)$ represents a spatio-temporal variance of a pixel signal and is obtained by $$\sigma_{ST}^2(i, j, t) = max\left[\sigma_f^2(i, j, t), \frac{\sigma_d^2(i, j, t) - \sigma_n^2}{2}\right] \quad \text{Equation (13)}$$

$$\sigma_d^2(i, j, t) = \frac{1}{S} \left\{ \sum_{(i,j) \in S} (g(i, j, t) - f_o(i, j, t-1))^2 \right\}$$

If there is a motion in a region having a large spatial difference such as an edge or detail, $\sigma_d^2(i,j,t)$ becomes quite large. On the other hand, $\sigma_d^2(i,j,t)$ of a flat region becomes very small when the temporal change of the signal is small even if there is a motion in the region. If a complete noise reduction was performed on a previous pixel signal (i.e., $f_o(i,j,t-1) = f(i,j,t-1)$), the noise is included only in the input pixel signal $g(i,j,t)$. Therefore the temporal variance of the original signal becomes $$\frac{\sigma_d^2(i, j, t) - \sigma_n^2}{2}.$$

Additionally, if there is no motion involved, the variance of the original signal f(i,j,t) in the support region becomes $\sigma_f^2$(i,j,t) since f(i,j,t) and $f_o$(i,j,t−1) are identical. Therefore, the spatio-temporal signal variance $\sigma_{ST}^2$(i,j,t) being used in Equation 12 is as shown as Equation 13.

In conclusion, for a region having large spatio-temporal changes (i.e., an edge/detail region having a motion), $\sigma_d^2$(i,j,t) and $\sigma_{ST}^2$(i,j,t) become quite large so that the weighting factor α(i,j,t) in Equation 12 becomes close to zero. Therefore the final output $f_o$(i,j,t) is close to the output from the spatial joint noise reduction filter 300 $f_s$(i,j,t). Additionally, $f_s$(i,j,t) also performs a gradual noise reduction on a region having large spatial changes, the final output becomes close to the input signal, preserving the edge/detail region. For the flat region, spatio-temporal changes are insignificant. Therefore, $\sigma_{ST}^2$(i,j,t) becomes quite small, forcing an aggressive noise reduction to generate the final output $f_o$(i,j,t).

According to the spatio-temporal joint three dimensional noise reduction filter shown above, the edge/detail preservation, the noise reduction for the flat region and flicker elimination properties are enhanced by combining a spatial joint noise reduction filter and a temporal joint reduction filter, each including two sub filters. Particularly, IIR type spatio-temporal noise reduction filter is used for performing a more aggressive noise reduction on the flat region of the image. It does not involve direct motion estimation, but has an implicit motion compensation effect by using spatio-temporal correlations between the adjacent frames.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A spatio-temporal joint filter for noise reduction comprising: a spatial joint filter including
   a first filter connected to an input determining a first weighted average of current support region signals of said input using first weighting factors, said current support region signals being included in a current frame, and
   a second filter connected to said input and an output of said first filter determining a second weighted sum of said input signal and said first weighted average using a second weighting factor that depends on an original signal variance and a noise variance; a temporal joint filter including
   a third filter connected to an output of said second filter determining a third weighted average of said second weighted sum and previous support region signals of said input signal using third weighting factors, said previous support region signals being included in a previous frame, and
   a fourth filter connected to an output of said second filter determining a fourth weighted sum of said second weighted sum and said third weighted average using a fourth weighting factor that depends on a spatio-temporal signal variance and said noise variance wherein said fourth weighted sum $f_o$ (i,j,t) is determined using the following equation:

$$\alpha(i, j, t) = \frac{\sigma_f^2(i, j, t)}{\sigma_f^2(i, j, t) + \sigma_n^2}$$

where
   $f_s$(i,j,t) is said second weighted sum,
   $\mu_T$(i,j,t) is said third weighted average,
   $\sigma^2_{ST}$ (i,j,t) is said spatio-temporal signal variance, and
   $\sigma^2_n$ is a noise variance;

$$\sigma_{ST}^2(i, j, t) = \max\left[\sigma_f^2(i, j, t), \frac{\sigma_d^2(i, j, t) - \sigma_n^2}{2}\right]$$

$$\sigma_d^2(i, j, t) = \frac{1}{S}\left\{\sum_{(i,j)\in S}(g(i, j, t) - f_o(i, j, t-1))^2\right\}$$

where
   $\sigma^2_f$ (i,j,t) is a original signal variance, and
   $f_o$(l,m,t−1) is a previous fourth weighted sum included in said support region of said previous frame; and
   a frame memory storing said fourth weighted sum and feedbacking said fourth weighted sum to said third filter for a next frame.

2. The spatio-temporal joint filter of claim 1, wherein said first weighted average g1(i,j,t) is determined using the following equation:

$$g1(i, j, t) = \frac{1}{W}\sum_{(l,m,t)\in S}\varpi(l, m, t)g(l, m, t)$$

$$W = \sum_{(l,m,t)\in S}\varpi(l, m, t)$$

where
   $\overline{\omega}$(l,m,t) is each first weighting factor,
   g(l,m,t) is each current support region signal, and
   S represents a support region of an image.

3. The spatio-temporal joint filter of claim 2, wherein said first filter is AWA filter, and each first weighting factor $\overline{\omega}$(l,m,t) is determined using the following equation:

$$\varpi(l, m, t) = \frac{1}{1 + \alpha\{\max[\varepsilon, (g(l, m, t) - g(i, j, t))^2]\}}$$

where α=1 and $\epsilon=2\sigma_n^2$, and g(i,j,t) is said input signal.

4. The spatio-temporal joint filter of claim 2, wherein said first filter is A-MEAN filter, and each said first weighting factor $\overline{\omega}$(l,m,t) is determined using the following question:

$$\varpi(l, m, t) = \begin{cases} 1 & \text{for } |x| \leq c \\ 0 & \text{for } |x| > c \end{cases}$$

$$x = g(l, m, t) - g(i, j, t)$$

Where c represents a predetermined limiting factor, and g(i,j,t) is said input signal.

5. The spatio-temporal joint filter of claim 1, wherein said second weighted sum $f_s(i,j,t)$ is determined using the following equation:

$$\alpha(i, j, t) = \frac{\sigma_f^2(i, j, t)}{\sigma_f^2(i, j, t) + \sigma_n^2}$$

where
- $g(i,j,t)$ is said input signal,
- $g1(i,j,t)$ is said first weighted average,
- $\alpha(i,j,t)$ is said second weighting factor,
- $\sigma_f^2(i,j,t)$ is said original signal variance, and
- $\sigma_n^2$ is said noise variance.

6. The spatio-temporal joint filter of claim 5, wherein said original signal variance $\sigma_f^2(i,j,t)$ is determined using the following equation:

$$\sigma_f^2(i,j,t) = \max[\sigma_g^2(i,j,t) - \sigma_n^2, 0]$$

where $\sigma_g^2(i,j,t)$ is a local variance of said input signal $g(i,j,t)$.

7. The spatio-temporal joint filter of claim 6, wherein said local variance $\sigma_g^2(i,j,t)$ is determined using the following equation:

$$\sigma_g^2(i, j, t) \cong \frac{1}{S} \sum_{(i,j) \in S} g^2(i, j, t) - \left[\frac{1}{S} \sum_{(i,j) \in S} g(i, j, t)\right]^2$$

where S represents a support region of an image of said input signal $g(i,j,t)$.

8. The spatio-temporal joint filter of claim 1, wherein said third weighted average $\mu_T(i,j,t)$ is determined using the following equation:

$$\mu_T(i, j, t) = \frac{1}{W} \left\{ \varpi_o f_s(i, j, t) + \sum_{l,m,t \in S} \varpi(l, m, t-1) f_o(l, m, t-1) \right\}$$

$$W = \varpi_o + \sum_{l,m,t \in S} \varpi(l, m, t-1)$$

where
- S represents a support region of an image,
- $f_s(i,j,t)$ is said second weighted sum,
- $\varpi(l,m,t-1)$ is each third weighting factor, and
- $f_o(l,m,t-1)$ is a previous forth weighted sum included in said support region of said previous frame.

9. The spatio-temporal joint filter of claim 8, wherein said third filter is an AWA filter, and $$\varpi_o = \frac{1}{1 + \alpha \varepsilon}$$

$$\varpi(l, m, t-1) = \frac{1}{1 + \alpha \{\max[\varepsilon, (f_o(l, m, t-1) - f_s(l, m, t))^2]\}}$$

where $\alpha = 1$ and $\epsilon = 2\sigma_n^2$.

10. The spatio-temporal joint filter of claim 8, wherein said third filter is an A-MEAN filter, and $$\varpi_o = 1, \varpi(l, m, t-1) = \begin{cases} 1 & \text{for } |x| \leq c \\ 0 & \text{for } |x| > c \end{cases}$$

$$x = f_o(l, m, t-1) - f_s(i, j, t)$$

Where c represents a predetermined limiting factor.

11. The spatio-temporal joint filter of claim 1, further comprising a statistic calculator providing variance signals to said first filter, second filter, third filter, and fourth filter.

* * * * *